United States Patent
Yang et al.

(10) Patent No.: US 8,656,103 B2
(45) Date of Patent: Feb. 18, 2014

(54) PROCESSOR AND METHOD FOR EXECUTING LOAD OPERATION THEREOF

(75) Inventors: Hui-Chin Yang, Hsinchu (TW); Shun-Chieh Chang, Taichung County (TW); Guan-Ying Chiou, Taoyuan County (TW); Chung-Ping Chung, Hsinchu (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/554,940

(22) Filed: Jul. 20, 2012

(65) Prior Publication Data

US 2012/0290791 A1 Nov. 15, 2012

Related U.S. Application Data

(62) Division of application No. 12/411,179, filed on Mar. 25, 2009, now abandoned.

(51) Int. Cl.
*G06F 12/00* (2006.01)

(52) U.S. Cl.
USPC .................. 711/118; 711/154; 711/E12.017

(58) Field of Classification Search
None
See application file for complete search history.

(56) References Cited

U.S. PATENT DOCUMENTS

| | | | | |
|---|---|---|---|---|
| 5,185,871 A * | 2/1993 | Frey et al. | | 711/124 |
| 5,202,972 A * | 4/1993 | Gusefski et al. | | 711/123 |
| 5,664,137 A * | 9/1997 | Abramson et al. | | 712/216 |
| 5,710,881 A * | 1/1998 | Gupta et al. | | 709/214 |
| 5,781,790 A * | 7/1998 | Abramson et al. | | 712/23 |
| 5,845,321 A * | 12/1998 | Ito et al. | | 711/118 |
| 5,878,245 A * | 3/1999 | Johnson et al. | | 711/154 |
| 5,893,153 A * | 4/1999 | Tzeng et al. | | 711/141 |
| 6,298,423 B1 * | 10/2001 | Johnson et al. | | 711/154 |
| 7,594,100 B2 * | 9/2009 | Cypher et al. | | 712/225 |
| 7,779,307 B1 * | 8/2010 | Favor et al. | | 714/45 |
| 2008/0104375 A1 * | 5/2008 | Hansen et al. | | 712/220 |

* cited by examiner

*Primary Examiner* — Matthew Bradley
*Assistant Examiner* — Daniel Bernard
(74) *Attorney, Agent, or Firm* — Winston Hsu; Scott Margo

(57) ABSTRACT

A processor and a method for executing load operation and store operation thereof are provided. The processor includes a data cache and a store buffer. When executing a store operation, if the address of the store operation is the same as the address of an existing entry in the store buffer, the data of the store operation is merged into the existing entry. When executing a load operation, if there is a memory dependency between an existing entry in the store buffer and the load operation, and the existing entry includes the complete data required by the load operation, the complete data is provided by the existing entry alone. If the existing entry does not include the complete data, the complete data is generated by assembling the existing entry and a corresponding entry in the data cache.

8 Claims, 4 Drawing Sheets

| Address | Mask | Data | Valid Bit | Matched Bit |
|---|---|---|---|---|
| | | | | |
| | | | | |
| | | | | |

FIG. 3

| Address | Data Type | Mask |
|---|---|---|
| 00 | 11 | 1111 |
| 00 | 01 | 1100 |
| 00 | 00 | 1000 |
| 01 | 00 | 0100 |
| 10 | 01 | 0011 |
| 10 | 00 | 0010 |
| 11 | 00 | 0001 |

FIG. 4

| | |
|---|---|
| Store Operation Mask | 1100 |
| Existing Entry Mask | 0010 |
| Merged Mask | 1110 |

FIG. 5

| | |
|---|---|
| Store Operation Mask | 1 1 0 0 |
| Store Operation Data | 4A5B0000 |
| Existing Entry Data | EC96D127 |
| Merged Data | 4A5BD127 |

FIG. 6

| | |
|---|---|
| Existing Entry Mask | 0 0 1 0 |
| Existing Entry Data | AAE43368 |
| Corresponding Entry Data | 7B8C1CFF |
| Complete Data | 7B8C33FF |

FIG. 7

PROCESSOR AND METHOD FOR EXECUTING LOAD OPERATION THEREOF

CROSS-REFERENCE TO RELATED APPLICATION

This application is a divisional application of U.S. application Ser. No. 12/411,179, filed on Mar. 25, 2009, now abandoned. The entirety of the above-mentioned patent application is hereby incorporated by reference herein and made a part of this specification.

BACKGROUND OF THE INVENTION

1. Field of the Invention

The present invention generally relates to memory operations of processors, and more particularly, to a processor and a method for executing a load operation and a store operation of the processor.

2. Description of Related Art

Most current processors generally adopt an instruction pipeline architecture to increase the performance of the processors. In order to reduce the time for obtaining data from a memory, one such processor typically includes a data cache for temporary storage of data that is read from the memory. The data cache is divided into a data RAM and a tag RAM. There are generally two types of memory operations, i.e., a load or read operation and a store or write operation. During the load operation, the data RAM and tag RAM can be read simultaneously. The read data is directly used if the result of a tag comparison is cache hit and discarded if the result of the tag comparison is cache miss. On the other hand, during the store operation, the tag RAM must be first read to compare the tag with store address. The data is stored in the data RAM only if the comparison result is cache hit.

Due to the above difference, the time for executing the load operation is less than the time for executing the store operation. When a store operation is followed by a load operation, read/write competition may occur in the instruction pipeline in which both the load operation and store operation attempt to concurrently access the data RAM. At this time, if the load operation waits until the store operation completes, stall of the load operation occurs which decreases the processing efficiency of the instruction pipeline.

To address the stall problem, U.S. Pat. No. 6,434,665 discloses a store buffer for temporary storage of parameters such as address and data of a store operation. As such, in case a read/write competition occurs in the data cache, the load operation can be executed before the data stored in the store buffer is written into the data cache. However, this method is only limited to be used when there is no memory dependency between the load operation and the store operation. That is, this method is only adapted to the situation where the address to be read in the load operation does not overlap with the address to be written in the store operation. When there is the above memory dependency, in order to read correct data, the load operation still must wait until the store operation completes and, therefore, the stall problem still exists.

To further solve the stall problem, U.S. Pat. No. 6,141,747 proposes another method. In this method, the data in the store buffer is directly forwarded to the load operation in case a read/write competition occurs and there is a memory dependency between the load operation and the store operation. As such, the load operation does not have to wait until the data is written into the data cache. In this method, the data is stored in the store buffer in words of multiple bytes. However, each piece of data is not necessarily a whole word or whole words. For example, the data may be half-word data or only one byte of the data is valid data. If the data to be used in the load operation is distributed in multiple entries of the store buffer, a complex assembling mechanism is required to assemble the scattered data in the multiple entries to form the data to be forwarded to the load operation. If the store buffer cannot provide the complete data required by the load operation, data parts in the store buffer need to be written into the data cache and then the data can be read from the data cache in the load operation, which also causes a stall problem in the instruction pipeline.

SUMMARY OF THE INVENTION

Accordingly, the present invention is directed to a method for executing a store operation that can merge data at a same address into a store buffer to solve the foregoing problem caused by scattered data of the store buffer.

The present invention is also directed to a method for executing a store operation that can assemble data of the store buffer and a data cache and forward the assembled data to the load operation to reduce the waiting time of the store operation when the store buffer contains only a part of the data required by the load operation.

The present invent is also directed to a processor executing the store operation and the load operation using the above methods, which can solve the foregoing problems and increase the processing efficiency.

The present invention provides a method for executing a store operation. In this method, a store buffer is first provided. When executing a store operation, a new entry is added in the store buffer according to the store operation if the store buffer has no entry which has a same address as an address of the store operation. Data of the store operation is merged into an existing entry of the store buffer if the address of the store operation is the same as the address of the existing entry.

In addition, the present invention provides a method for executing a load operation. In this method, a data cache and a store buffer is first provided. When executing a load operation, data required by the load operation is read from the data cache if there is no memory dependency between all entries of the store buffer and the load operation. An existing entry of the store buffer provides complete data required by the load operation if there is a memory dependency between the existing entry and the load operation and the existing entry contains the complete data required by the load operation. The complete data required by the load operation is generated according to data of an existing entry of the store buffer and data of a corresponding entry of the data cache if there is a memory dependency between the existing entry and the load operation and the existing entry does not contain the complete data.

The present invention provides a processor including a data cache and a store buffer. The data cache stores data read from a memory. The store buffer is coupled to the data cache. The store buffer is used for temporary storage of an address and data of a store operation when a load operation and the store operation compete to access the data cache. The processor adds a new entry in the store buffer according to the store operation if the store buffer has no entry which has a same address as an address of the store operation. The processor merges data of the store operation into an existing entry of the store buffer if the address of the store operation is the same as the address of the existing entry.

According to one embodiment of the present invention, the new entry includes the address, a mask and the data of the store operation.

According to one embodiment of the present invention, when merging the data of the store operation into the existing entry, the processor generates a mask of the store operation according to the address and a data type of the store operation, generates a merged mask according to the mask of the store operation and a mask of the existing entry, generates merged data according to the mask and data of the store operation and data of the existing entry, and stores the merged mask and merged data into the existing entry.

According to one embodiment of the present invention, the merged mask is generated based on a logic operation on the mask of the store operation and the mask of the existing entry. Each bit of the mask of the store operation is a first preset value or a second preset value. A portion of the merged data that corresponds to the first preset value adopts the data of the store operation, and a portion of the merged data that corresponds to the second preset value adopts the data of the existing entry.

In addition, the present invention provides a processor including a data cache and a store buffer. The data cache stores data read from a memory. The store buffer is coupled to the data cache and is used for temporary storage of an address and data of a store operation when a load operation and the store operation compete to access the data cache. The processor reads data required by the load operation from the data cache if there is no memory dependency between all entries of the store buffer and the load operation. The processor reads complete data required by the load operation from an existing entry of the store buffer if there is a memory dependency between the existing entry and the load operation and the existing entry contains the complete data required by the load operation. The processor generates the complete data required by the load operation according to data of an existing entry of the store buffer and data of a corresponding entry of the data cache if there is a memory dependency between the existing entry and the load operation and the existing entry does not contain the complete data.

According to one embodiment of the present invention, the address of the existing entry of the store buffer is the same as the address of the corresponding entry of the data cache. The aforementioned complete data is generated based on the mask and the data of the existing entry and the data of the corresponding entry.

According to one embodiment of the present invention, each bit of the mask of the existing entry is a first preset value or a second preset value, a portion of the complete data that corresponds to the first preset value adopts the data of the existing entry, and a portion of the complete data that corresponds to the second preset value adopts the data of the corresponding entry.

In order to make the aforementioned and other features and advantages of the present invention more comprehensible, embodiments accompanied with figures are described in detail below.

BRIEF DESCRIPTION OF THE DRAWINGS

FIG. 3 illustrates an internal data structure of a store buffer according to one embodiment of the present invention.

FIG. 4 illustrates a method for generating a memory operation mask according to one embodiment of the present invention.

FIG. 5 illustrates a mask operation during the merging of data into the store buffer according to one embodiment of the present invention.

FIG. 6 illustrates a data operation during the merging of data into the store buffer according to one embodiment of the present invention.

FIG. 7 illustrates an operation during the assembling of the store buffer and the data cache to generate the data required by the load operation according to one embodiment of the present invention.

DESCRIPTION OF THE EMBODIMENTS

Figure 1:
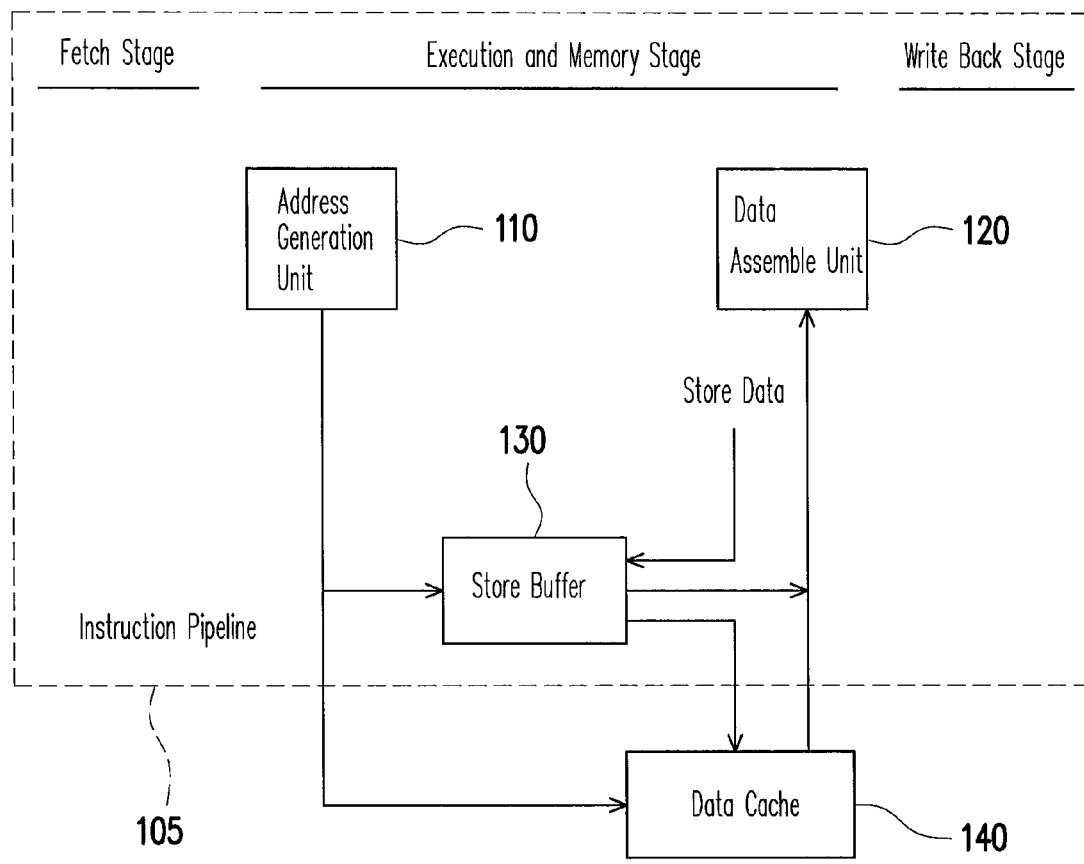
FIG. 1 illustrates an architecture of a processor according to one embodiment of the present invention.

FIG. 1 illustrates the architecture of a processor 100 according to one embodiment of the present invention. The processor 100 includes an address generation unit (AGU) 110, a data assemble unit 120, a store buffer 130, and a data cache 140. The AGU 110, data assemble unit 120, and store buffer 130 belong to the memory and execution stage of an instruction pipeline 105 and are coupled to each another via the instruction pipeline 105. The store buffer 130 is also coupled to the data cache 140.

The AGU 110 operates to generate addresses for the load operation and store operation. The data cache 140 stores data read from a memory (not shown). When the load operation and the store operation compete to access the data cache 140, the store buffer 130 temporarily stores the address and data of the store operation. The data assemble unit 120 may assemble the data from the store buffer 130 and data from the data cache 140, and the assembled data can be used by the load operation as described below in greater detail. The store buffer 130 may be used to address the read/write competition in the data cache 140 to increase the processing efficiency of the instruction pipeline 105. When the read/write competition occurs, the load operation is executed prior to the store operation.

Figure 2:
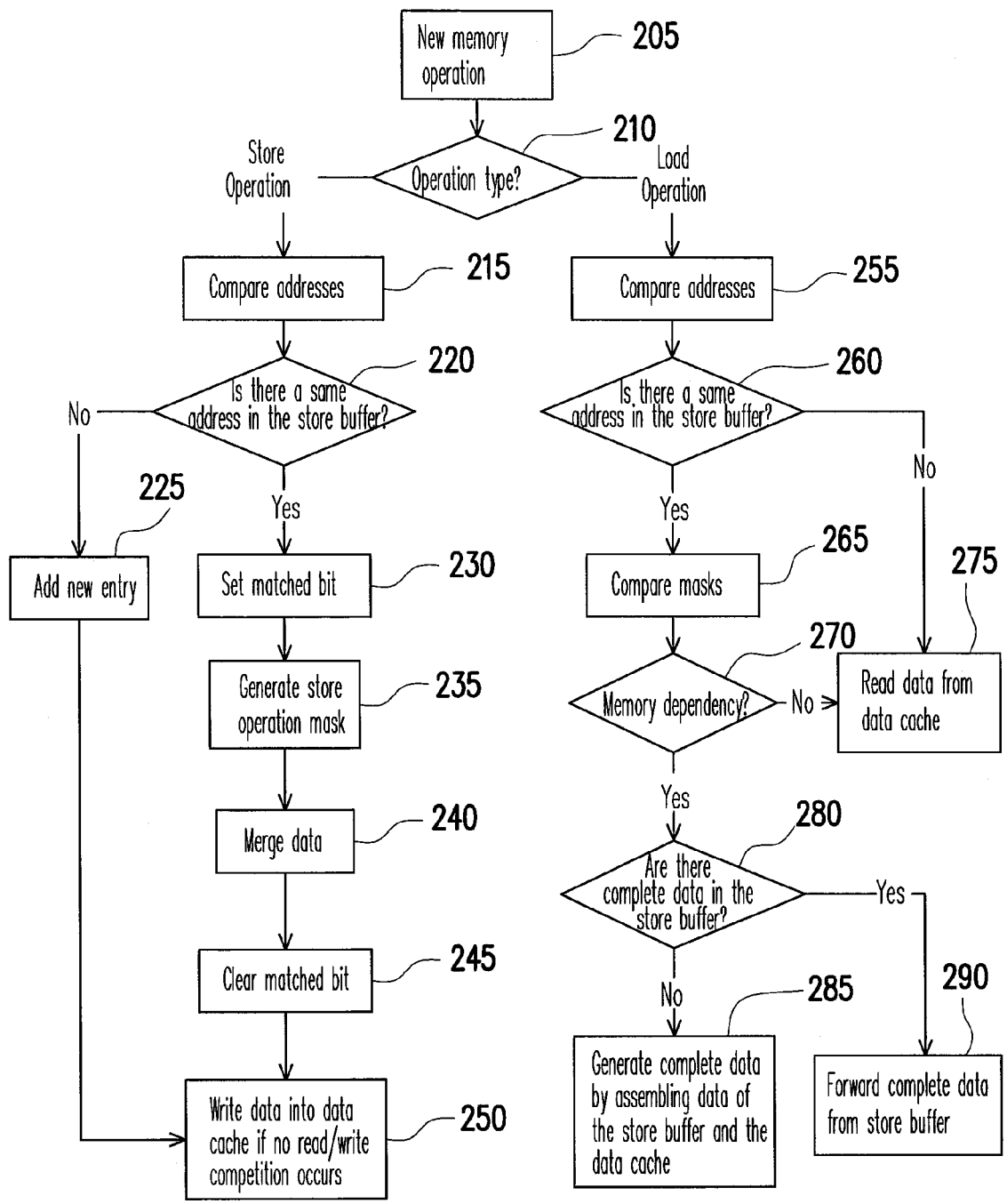
FIG. 2 is a flow chart of a store operation and a load operation according to one embodiment of the present invention.

FIG. 2 is a flow chart of a memory operation executed by the processor 100 of the present embodiment. Firstly, the AGU 110 in the front of the execution stage generates the address and data type (data type is described later) of each memory operation (step 205). Then, the processor 110 determines the type of the memory operation (step 210). If it is a store operation, the processor 100 compares the address of the store operation with an address of each entry of the store buffer 130 (step 215) to check if any entry in the store buffer 130 has a same address as the address of the store operation (step 220). If there is no same address, the processor 100 adds a new entry in the store buffer 130.

FIG. 3 illustrates a data structure stored in the store buffer 130 of the present embodiment. The data stored in the store buffer 130 has a length of one word. Each word has four bytes and is thirty-two bits long. Each row of the table of FIG. 3 represents an entry including five fields, i.e., address, mask, data, valid bit, and matched bit.

The address field of FIG. 3 records the address of the store operation, with two least significant bits (LSB) removed to fit the data length of one word. The mask field of FIG. 3 records a mask of the store operation. Generation of the mask is shown in the table of FIG. 4. In FIG. 4, all numerals are binary and the two least significant bits of the store operation address are written into the address field. The data type field of FIG. 4 records the data type of the store operation where "00" represents byte, "01" represents half word consisting of two bytes, and "11" represents word consisting of four bytes. The mask field of FIG. 4 records the mask generated according to the address and data type of the same row, which is also the value filled in the mask field of FIG. 3 when adding a new entry. Because the length of the data stored in each entry of the store buffer 130 is four bytes, the length of the mask field of each entry is four bits long. The four bits of the mask field and the four bytes of the data field are in one-to-one correspondence to each other. If the bit of the mask field is "1", it represents the corresponding byte is valid data. In an alternative embodiment of the present invention, bit "0" of the mask field may be used to represent that the corresponding byte is valid data.

The data field of FIG. 3 records the data to be written in the store operation. When the valid bit is set, it represents that the entry having the valid bit is valid. When the valid bit is cleared, it represents that the entry having the valid bit is invalid and can be overwritten with a new entry. The matched bit is used in the data merging step (step 240) as described later in greater detail. When adding a new entry, the processor 100 generates a mask according to the address and data type of the store operation, writes the address and mask of the store operation into corresponding fields of the entry, sets the valid bit, and clears the matched bit. In a later stage of the instruction line 105, when the data of the store operation has been prepared, the processor 100 writes the data into the data field of the entry.

In the present embodiment, the three bit fields are all configured such that bit "1" represents a setting state and bit "0" represents a clearing state. In alternative embodiments of the present invention, it is also possible that bit "0" represents a setting state and bit "1" represents a clearing state. In the present embodiment, the entry of the store buffer 130 can record data of a maximum of thirty-two bits long. However, the present invention should not be limited to the embodiments described herein and the data field length of the entry can be modified depending upon actual requirements in alternative embodiments. For example, if data of sixty-four bits long, i.e., a double word, is to be stored, the address field of each entry can be modified such that three least significant bits are removed from the complete address, the mask field can be lengthened to eight bits, and the data length can be lengthened to eight bytes.

Referring back to FIG. 2, in the checking step 220, if the address of the store operation is the same as the address of an existing entry of the store buffer 130, the processor 100 proceeds to steps 230-245 such that the data of the store operation is merged into the existing entry, as described below in detail.

Firstly, the processor 100 sets a matched bit of the existing entry (step 230) which indicates that data merging is going to be performed, and generates a mask of the store operation according to the address and data type of the store operation in the manner illustrated in FIG. 4 (step 235). In a later stage of the instruction pipeline 105, when the data has been prepared, the processor 100 merges the data of the store operation into the existing entry (step 240), and clears the matched bit (step 245) which indicates that data merging has been completed.

An exemplary step 240 is illustrated in detail in FIG. 5 and FIG. 6 where the masks are both binary numbers and the data are all hexadecimal numbers. During data merging, the processor 100 performs a logic OR operation on the mask of the store operation and the mask of the existing entry to generate a merged mask, as shown in FIG. 5. In addition, the processor 100 assembles the data of the store operation and the data of the existing entry to generate merged data. An exemplary way of assembling the data is shown in FIG. 6. In this example, the data of store operation takes the priority and bit "1" in the store operation mask represents that the bytes of the corresponding store operation data are valid data. Therefore, the processor 100 adopts the data of the store operation for the bytes corresponding to bit "1", and adopts the data of the existing entry for the bytes corresponding to bit "0", which results in the merged data.

In an alternative embodiment of the present invention, in the store operation mask and existing entry mask, bit "0" represents that the corresponding data bytes are valid data. In this case, the processor 100 performs a logic AND operation on the store operation mask and the existing entry mask to generate a merged mask. As to the data merging, the processor 100 adopts the store operation data for the bytes corresponding to bit "0" in the store operation mask and adopts the existing entry data for the bytes corresponding to bit "1".

Next, the processor 100 stores the merged mask and merged data in the existing entry. As such, the store buffer 130 has at most one entry for data at a same address, which is different from the conventional technology in which data at a same address are distributed in multiple entries and data of multiple entries need to be merged during the forwarding operation.

After writing the store operation data into the store buffer 130 or merging the store operation data into the existing entry of the store buffer 130, the processor 100 writes the data of the entry with a longest history in the store buffer 130 into the data cache 140 if no read/write competition occurs in the data cache 140 (step 250). For example, the store buffer 130 can be configured in a first-in first-out queue such that the entry at the head of the store buffer 130 has the longest history. After writing the data into the data cache 140, the processor 100 clears the valid bit of the entry having the longest history to release the storage space of the entry. Then, the process flow ends.

The flow that the processor 100 executes the store operation has been described above. On the other hand, in the determination step 210, if the new memory operation is a load operation, the processor 100 compares the address of the load operation with the address of each entry in the store buffer 130 (step 255) to check if the address of any entry is the same as the address of the load operation (step 260). If there is no same address, the processor 100 directly reads data from the data cache 140 and allows the load operation to use the read data (step 275). Then, the process flow ends.

If the store buffer 130 has an existing entry which has a same address as the address of the load operation, the processor 100 proceeds to compare the load operation mask with the existing entry mask to check if the two masks overlap (if they have common bit "1" or not) (step 270). The load operation mask is likewise generated in the manner shown in FIG. 4. If the two masks do not overlap, the processor 100 likewise directly reads data from the data cache 140 and allows the load operation to use the read data (step 275). Then, the process flow ends.

On the contrary, if the address of the existing entry is the same as the address of the load operation and the existing entry mask overlaps with the load operation mask, which represents that there is memory dependency between the store buffer 130 and the load operation, complete or a part of data required by the load operation must be provided by the store buffer 130. Next, the processor 100 checks if the existing entry contains the complete data required by the load operation (step 280). If yes, the processor 100 reads the complete data from the data field of the existing entry and forwards the complete data to the load operation for use (step 290). Then, the process flow ends.

If the existing entry contains only a part of data required by the load operation instead of the complete data, the processor 100 assembles the data of the existing entry and data of a corresponding entry in the data cache 140 that has the same address to generate the complete data required by the load operation, and forwards the complete data to the load operation for use (step 285). Then, the process flow ends.

The data are assembled in an exemplary manner as shown in FIG. 7 where the masks are binary numbers and the data are hexadecimal numbers. In this exemplary manner of data assembling, the existing entry of the store buffer takes the priority and bit "1" in the store operation mask represents that the data bytes of the existing entry are valid data. Therefore, the processor 100 adopts the data of the existing entry for the bytes corresponding to bit "1", and adopts the data of the corresponding entry of the data cache 140 for the bytes corresponding to bit "0", which results in the complete data to be forwarded to the load operation.

In an alternative embodiment of the present invention, in the mask of the existing entry of the store buffer 130, bit "0" represents that the corresponding data bytes are valid data. In this case, the processor 100 adopts the existing entry data for the bytes corresponding to bit "0" in the existing entry mask, and adopts the data of the corresponding entry of the data cache 140 for the bytes corresponding to bit "1".

If there were no data assembling step 285, the data of the existing entry must be written into the data cache 140 before the complete data can be read out from the data cache 140. The data assembling of the present embodiment at least eliminates the time of writing the existing entry data into the data cache 140.

In summary, in the present invention, the data of the store operation is merged into the existing entry of the store buffer such that data of the same address are contained in at most one entry, which saves the storage space of the store buffer and reduces the complexity of forwarding data from the store buffer to the load operation. The present invention can directly assemble the data in the store buffer and the data cache and forward the assembled data to the load operation, which eliminates the time of writing the data from the store buffer to the data cache thus enhancing the efficiency of the processor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for executing a load operation, comprising:
providing a data cache and a store buffer;
when executing a load operation, reading data required by the load operation from the data cache if there is no memory dependency between all entries of the store buffer and the load operation, the memory dependency being such that an address of any of the entries is the same as an address of the load operation and a mask of said entry overlaps with a mask of the load operation;
providing complete data required by the load operation by an existing entry of the store buffer if there is memory dependency between the existing entry and the load operation and the existing entry contains the complete data required by the load operation; and
generating the complete data required by the load operation according to data of the existing entry of the store buffer and data of a corresponding entry of the data cache if there is memory dependency between the existing entry and the load operation and the existing entry does not contain the complete data, wherein the data of the existing entry of the store buffer and the data of the corresponding entry of the data cache are assembled to generate the complete data.

2. The method for executing the load operation according to claim 1, wherein an address of the existing entry is the same as an address of the corresponding entry.

3. The method for executing the load operation according to claim 1, wherein the complete data is generated based on a mask of the existing entry and the data of the existing entry and the data of the corresponding entry.

4. The method for executing the load operation according to claim 3, wherein each bit of the mask of the existing entry is a first preset value or a second preset value, a portion of the complete data that corresponds to the first preset value adopts the data of the existing entry, and a portion of the complete data that corresponds to the second preset value adopts the data of the corresponding entry.

5. A processor comprising:
a data cache configured to store data read from a memory; and
a store buffer coupled to the data cache and configured for temporary storage of an address of a store operation and data of the store operation when a load operation and the store operation compete to access the data cache; wherein
the processor reads data required by the load operation from the data cache if there is no memory dependency between all entries of the store buffer and the load operation, the memory dependency being such that an address of any of the entries is the same as an address of the load operation and a mask of said entry overlaps with a mask of the load operation;
the processor reads complete data required by the load operation from an existing entry of the store buffer if there is memory dependency between the existing entry and the load operation and the existing entry contains the complete data required by the load operation; and
the processor generates the complete data required by the load operation according to data of the existing entry of the store buffer and data of a corresponding entry of the data cache if there is memory dependency between the existing entry and the load operation and the existing entry does not contain the complete data, wherein the data of the existing entry of the store buffer and the data of the corresponding entry of the data cache are assembled to generate the complete data.

6. The processor according to claim 5, wherein an address of the existing entry is the same as an address of the corresponding entry.

7. The processor according to claim 5, wherein the complete data is generated based on a mask of the existing entry and the data of the existing entry and the data of the corresponding entry.

8. The processor according to claim 7, wherein each bit of the mask of the existing entry is a first preset value or a second preset value, a portion of the complete data that corresponds to the first preset value adopts the data of the existing entry, and a portion of the complete data that corresponds to the second preset value adopts the data of the corresponding entry.

* * * * *